Aug. 13, 1963 J. V. FREDD 3,100,533

ANCHORING AND SEALING DEVICE

Filed Aug. 27, 1959 4 Sheets-Sheet 1

INVENTOR

John V. Fredd

BY Hastings Ackley

ATTORNEY

ANCHORING AND SEALING DEVICE

Filed Aug. 27, 1959 4 Sheets-Sheet 2

INVENTOR
John V. Fredd
BY Hastings Ackley
ATTORNEY

INVENTOR
John V. Fredd
BY [signature]
ATTORNEY

ANCHORING AND SEALING DEVICE

Filed Aug. 27, 1959 4 Sheets-Sheet 4

INVENTOR
John V. Fredd
BY [signature]
ATTORNEY

United States Patent Office 3,100,533
Patented Aug. 13, 1963

3,100,533

ANCHORING AND SEALING DEVICE

John V. Fredd, Dallas, Tex., assignor to Otis Engineering Corporation, Dallas, Tex., a corporation of Delaware Filed Aug. 27, 1959, Ser. No. 836,512
21 Claims. (Cl. 166—125)

This invention relates to well tools and more particularly to anchoring and sealing devices for releasably securing well devices in a well flow conductor without subjecting the well devices to jars or shocks during anchoring, sealing and removal operations of the anchoring and sealing device.

An object of the invention is to provide a new and improved anchoring and sealing device for releasably securing devices in a well flow conductor without subjecting the well devices to jars or shocks during anchoring or removal operations of the anchoring and sealing device.

Still another object is to provide an anchoring and sealing device for releasably securing jar sensitive well devices in a well flow conductor and for plugging the well flow conductor above the well device without subjecting the well device to shocks or jars during anchoring, plugging, releasing and removing operations of the anchoring and sealing device.

A further object is to provide an anchoring and sealing device which may be anchored in a well flow conductor and subsequently released therefrom by continuous substantially uniform constant upwardly and downwardly directed forces whereby jars or shocks are not imparted to the anchoring and sealing device.

A still further object of the invention is to provide an anchoring and sealing device for positioning well devices, such as pressure gauges or bombs, in a well flow conductor and for sealing the well flow conductor above such well device having pressure equalizing means for equalizing the pressure across the anchoring and sealing device which is maintained open during the installation of the anchoring device in a preselected position in the well flow conductor, closed upon completion of the anchoring operation and of the sealing operation and subsequently opened to facilitate release and removal of the anchoring and sealing device from the well flow conductor.

Another object is to provide an anchoring and sealing device having anchor means engageable in an internal recess of a well flow conductor to anchor the anchoring and sealing device in a predetermined position in the well flow conductor, a locking means for holding the anchor means in expanded locking positions, a sealing means movable into sealing engagement with the well flow conductor to seal between the anchoring and sealing device and the well flow conductor, pressure equalizing means for equalizing the pressure across the anchoring and sealing device, and means operable by continuous substantially constant upwardly or downwardly directed forces and without imparting jars or shocks to the anchoring and sealing device for successively locking the anchoring means in expanded position, moving the sealing means into sealing engagement with the well flow conductor and simultaneously holding the pressure equalizing means in closed position.

Still another object is to provide a new and improved anchoring and sealing device operable by continuous upwardly or downwardly directed forces without the requirement of imparting jars to the anchoring and sealing device having cooperable slot and control pin means between longitudinally aligned operative elements thereof which provide for a predetermined sequence of operation of longitudinal and rotational movements between the operative elements of the anchoring and sealing device to effectuate the anchoring, sealing and pressure equalizing operations thereof under the influence of upwardly or downwardly directed forces without imparting jars to the device.

Still another object is to provide a new and improved anchoring and sealing device operable by continuous upwardly or downwardly directed forces without the requirement of imparting jars to the anchoring and sealing device having cooperable slot and control pin means between longitudinally aligned operative elements thereof which provide for a predetermined sequence of operation of longitudinal and rotational movements between the operative elements of the anchoring and sealing device to effectuate the anchoring, sealing and pressure equalizing operations thereof under the influence of upwardly or downwardly directed forces, and resilient means biasing the elements for rotational movement relative to one another as limited by the slot and control pin means upon relative longitudinal movement between the operative elements.

Additional objects and advantages of the invention will be readily apparent from the reading of the following description of a device constructed in accordance with the invention, and reference to the accompanying drawings thereof, wherein.

Figure 7:
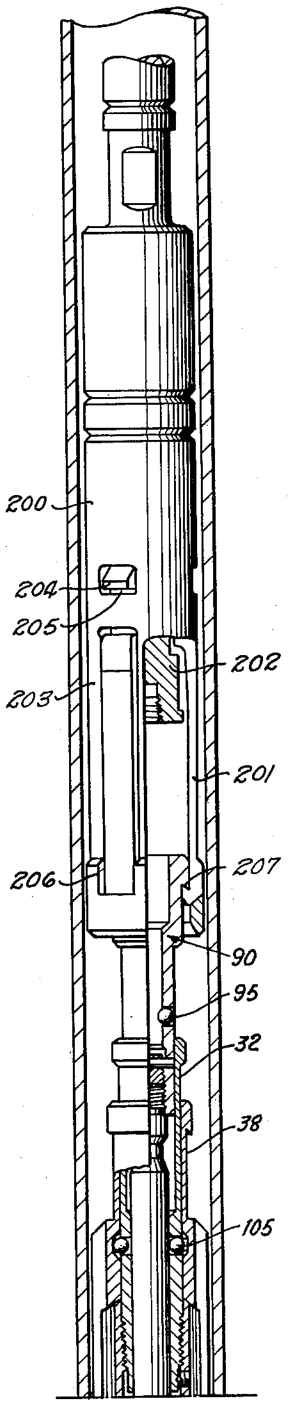
Figure 8:
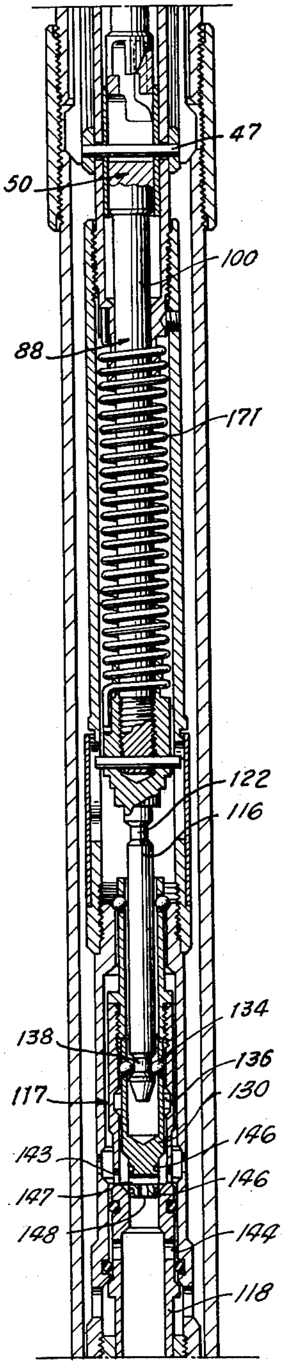
Figure 9:
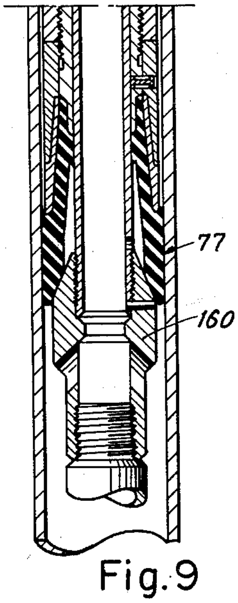
Figure 10:
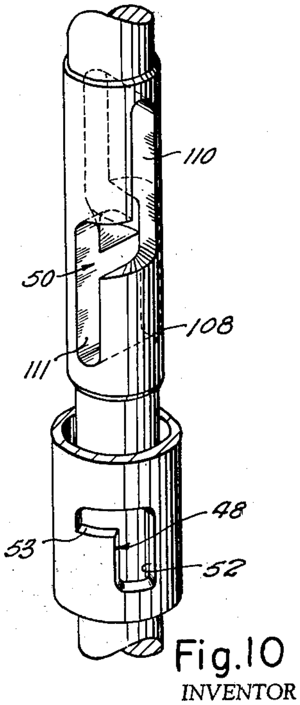
Figures 11, 12, 13, 14, 15, 16, 17, 18, 19, 20:
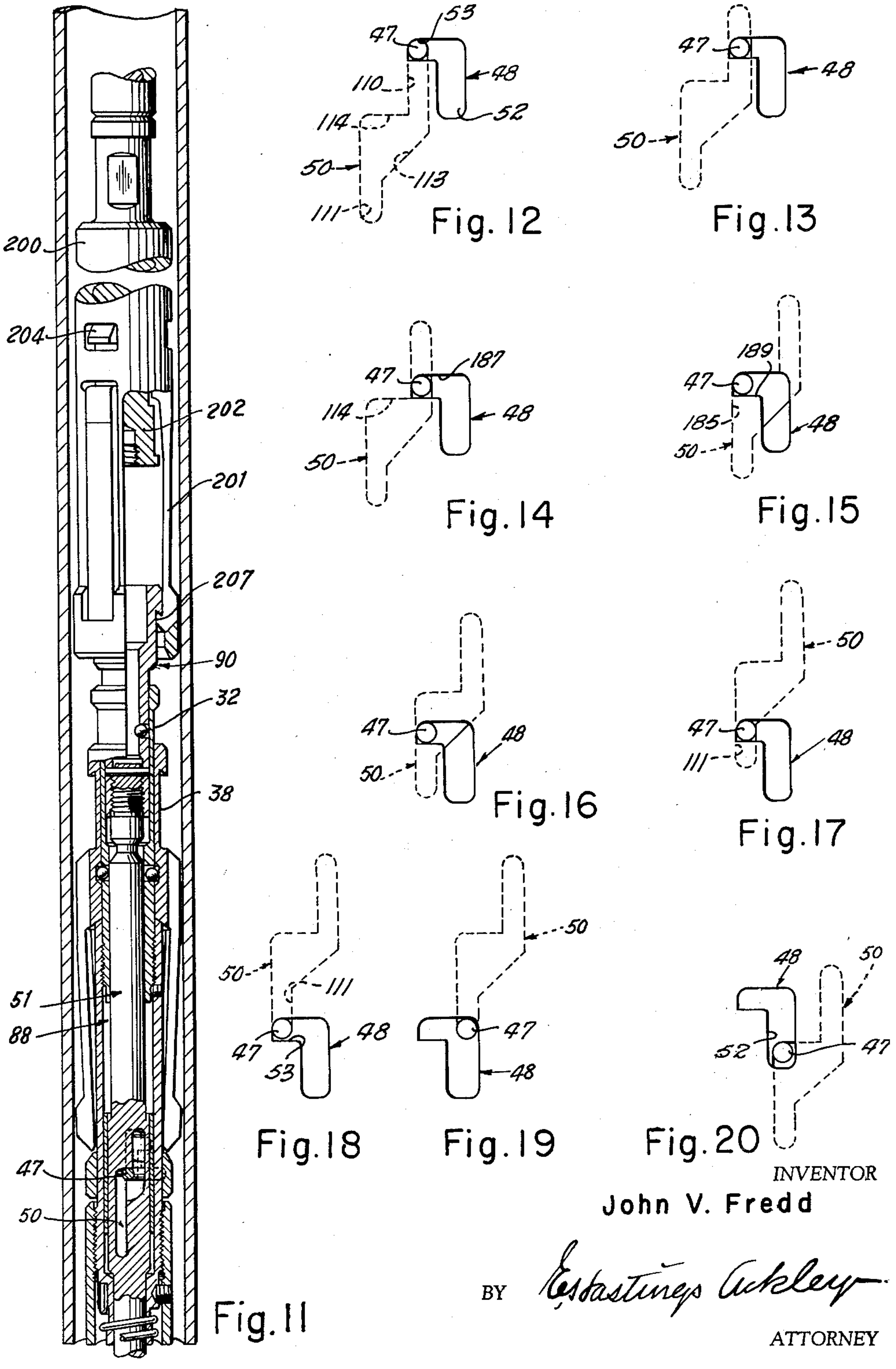

FIGURE 7 is a view, partly in elevation and partly in section, with some parts broken away, of the upper portions of the anchoring and sealing device and of a pulling tool showing the operative elements of the anchoring and sealing device in an intermediate stage of the release cycle of operation thereof wherein a pressure equalizing means has been moved to open position by means of the pulling tool to equalize the pressure above and below the anchoring and sealing device;

FIGURE 8 is a view similar to FIGURE 7, being a continuation thereof, and showing intermediate portions of the anchoring and sealing device;

FIGURE 9 is a view similar to FIGURE 8, being a continuation thereof, and showing the lower portions of the anchoring and sealing device;

FIGURE 10 is a fragmentary perspective exploded view of two of the elements of the anchoring and sealing device;

FIGURE 11 is a view in elevation and partly in section, with some parts broken away, of the upper portion of the anchoring and sealing device and of the pulling tool showing the elements of the anchoring and sealing device as they appear during their upward removal from the well flow conductor by the pulling tool; and FIGURES 12 through 20 are diagrammatic illustrations of the various operative positions assumed by cooperable control pin and slot means of the anchoring and sealing device during anchoring, sealing, pressure equalizing and releasing operations of the anchoring and sealing device.

Referring now to the drawing, the anchoring and sealing device 30 is adapted to be positioned in a well flow conductor, such as the tubing string T which includes tubing sections 12 joined by coupling collars 13 so that the spaced adjacent ends of adjacent tubing sections and the collars form coupling collar recesses 14.

The anchoring and sealing device includes an elongate outer tubular member or mandrel 31 having a collet mandrel 32, a collet expander mandrel 33, a spring housing 34, a by-pass mandrel 35 and a packer assembly 36 which are threadedly connected together in the sequence set forth. A collet 38 is slidably disposed on the collet mandrel for limited longitudinal movement thereon, upward movement of the collet 38 being limited by the engagement of its upper end with the downwardly facing annular shoulder 39 of the collet mandrel and downward movement of the collet being limited by the engagement of its internal downwardly facing shoulder 40 with the upper end of the expander mandrel 33.

The collet 38 is provided with a plurality of resilient fingers 41 having external bosses 42 provided with outwardly convergent upper and lower shoulders 43 and 44. The bosses 42 are adapted to be received in any selected collar recess 14 of the tubing string to position the anchoring and sealing device below such selected collar recess. The resilient fingers 41 tend to assume the expanded positions illustrated in FIGURE 4 and are forced inwardly to the retracted positions illustrated in FIGURES 1 and 11 upon contact with the tubing sections.

The lower ends of the collet fingers are held in their expanded positions by an annular collet expander 46 provided with a transverse control pin 47 which extends through oppositely disposed substantially L-shaped guide slots 48 of the expander mandrel, through aligned apertures of the sleeve 49 which is slidably disposed in the expander mandrel, and through a cooperating guide slot 50 of a core member 51 within the outer tubular member 31. The L-shaped slots have elongate portions 52 and transverse portions 53 communicating with the upper ends of the longitudinal portions whereby the collet expander 46 may be moved longitudinally on the expander mandrel only when the pin 47 is aligned in the longitudinal portions 52 of the slots 48 and is held against longitudinal movement relative to the expander mandrel when the control pin of the expander is disposed in the transverse portions 53 of the guide slot 48.

The collet expander and the control pin are rotated relative to the elongate outer member by the coaction of the control pin with the surfaces defining the slot 50 of the core member 51 upon longitudinal movement of the core member relative to the outer tubular member as will be explained below. The sleeve 49 closes the slots 48 to prevent foreign materials from entering into the outer tubular member through the slots.

The spring housing 34 is provided with oppositely disposed inverted substantially U-shaped slots 55 in which are received opposite end portions of a lower transverse pin 56 of the core member 51. Each of the guide slots 55 is provided with a long longitudinal portion 55a connected by an upper transverse portion 57 to an upper short longitudinal portion 58 in turn connected to a lower longitudinal portion 59 by an intermediate transverse portion 60 so that the lower longitudinal section is spaced farther from the long longitudinal portion than the short upper longitudinal portion.

The spring housing is provided with a housing sleeve 62 which closes the substantially U-shaped slots 55. The lower end of the housing sleeve telescopes over an enlarged portion 63 of the spring housing and its downward movement is limited by the upwardly facing annular shoulder 64 of the spring housing. The upper end of the housing sleeve is aligned with an annular external recess 65 of the spring housing and its upper end is rigidly secured to the housing by any suitable means, such as by inturning or staking upper end portions of the sleeve into the annular recess 65.

The bypass mandrel 35 of the outer tubular member or mandrel is provided with a plurality of upper lateral ports 68 in an intermediate portion of the bypass mandrel and with a plurality of lateral ports 69 in the lower portion 70 of larger internal and external diameters.

The packer assembly 36 includes a seal mandrel 72 threaded into the enlarged lower portion 70 of the bypass mandrel and an annular seal retainer member 73 threaded on the packer mandrel which are held against rotation relative to one another by a pin 75 extending through aligned apertures in the retainer and in the seal mandrel. The tubular seal 77 is tubular in form opening downwardly and has an inwardly and upwardly tapered upper portion 78 extending between the lower reduced portion 80 of the seal mandrel and an annular reinforcing resilient member 82 disposed in the downwardly and outwardly beveled portion 83 of the retainer member 73. The reinforcing member is less resilient however than the tubular seal so that it affords some lateral support to intermediate portions of the tubular seal while still permitting some outward movement thereof. The seal 77 is also provided with an annular internal flange 84 whose upper end abuts the lower end of the seal mandrel and whose internal surface engages in fluid tight relation the external wall surface of the core member 51. The internal flange 84 is provided with a downwardly opening annular recess 85 whereby fluid pressure acting upwardly will tend to tightly urge the flange against the core member.

The core member 51 includes an upper section 88 having a fishing neck 90 provided at its upper end with an external annular flange 91 having an undercut downwardly and outwardly extending shoulder 92 and also having a reduced lower portion telescopable into the upper end of the collet mandrel 32 of the outer tubular member. The reduced lower portion 93 of the fishing neck 90 has a plurality of circumferentially spaced lateral apertures 94 in which are disposed latch balls 95 adapted to extend inwardly into an annular external latch recess 96 of the prong 97 of a running tool 98 when the prong is telescoped into the fishing neck. The lateral apertures 94 have slightly inturned edges which permit the balls to move inwardly and outwardly so that portions thereof may extend either inwardly or outwardly of the reduced lower portion 93 of the fishing neck while at the same time preventing their complete displacement from the ball apertures.

The upper section of the core member also includes a control core 100 which is threaded into the lower end of the fishing neck and secured against rotation relative thereto by a transverse pin 101 extending through aligned apertures of the fishing neck and of the control core. The control core is provided adjacent its upper end with an external annular latch recess 104 in which are receivable the inner portions of the latch balls 105 carried by the collet mandrel in circumferentially spaced lateral apertures 106 thereof. The latch balls hold the control core 100, and therefore the upper section 88 of the core member 51, against longitudinal movement in the collet mandrel until the collet mandrel has been moved upwardly relative to the collet 38 to a position wherein the latch balls are aligned with an internal annular latch recess 107 of the collet. The ball apertures 106 also have slightly inwardly extending lips which limit both outward and inward movement of the balls so that while the balls may move between the positions illustrated in FIGURES 2 and 7, they may not be entirely displaced from the ball apertures.

The guide slot 50 is located in the enlarged portion 108 of the control core disposed in the expander mandrel 33 of the outer tubular member and in alignment with the oppositely disposed L-shaped guide slots 48 thereof. The control core guide slot has an upper longitudinal portion 110 and a lower longitudinal slot portion 111 laterally spaced from the upper longitudinal slot portion 110 which are connected by a transverse slot portion 112 defined by the upwardly facing surface 113 of the core member which slopes downwardly from the lower end of the upper guide slot portion 110 to the upper end of the lower longitudinal slot portion 111 and by the upper downwardly facing shoulder or surface 114 which extends transversely and perpendicularly of the longitudinal axis of the control core.

As will be explained below, relative movement of the upper section 88 of the core member 51 relative to the collet expander and the outer tubular member is governed by the engagement of the upper control pin 47 in the slots 48 and 50 of the expander mandrel and of the core member 51, respectively, the engagement of the lower control pin 56 in the slots 55 of the spring housing 34, and the relative rotational position of the upper section of the core member with respect to the outer tubular member.

The upper section 88 of the core member also includes a control prong 116 whose enlarged upper end is threaded on the lower end of the control core 100 and is secured against rotational movement with respect thereto by the lower control pin 56 whose outer end portions extend outwardly of the enlarged portion of the control prong into the slots 55 of the spring housing 34. The control prong 116 telescopes downwardly into the lower section 117 of the core member 51 which includes a pull sleeve 118 having an extension 119 threaded into the upper end thereof. The sleeve extension 119 is provided with a plurality of circumferentially spaced apertures 120 in which are disposed the latch balls 121 adapted to move into the upper annular recess 122 of the control prong to cause the lower core member section to move longitudinally with the control prong and therefore with the upper core member section as long as the latch balls 121 extend inwardly into the upper latch recess 122. The external flange 125 of the sleeve extension is disposed below the downwardly facing shoulder 126 of the bypass mandrel disposed below the latching surface 128 of the bypass mandrel formed by the decrease in diameter of the upper portion of the bore of the bypass mandrel. The latching surface engages the latch balls 121 of the sleeve extension when the pull sleeve and its sleeve extension are in the lower position in the bypass mandrel illustrated in FIGURE 3. The control prong may move upwardly relative to the pull sleeve and the sleeve extension when the sleeve extension has been moved to the upper position illustrated in FIGURES 5 and 8 wherein the latch balls 121 are disposed above the upper end of the bypass mandrel and are free to move outwardly from the upper latch recess of the control prong.

A bypass plug 130 is longitudinally slidably disposed in the sleeve and has an upwardly opening bore 131 in which is telescopable the lower end of the control prong 116. The bypass plug is provided with a plurality of circumferentially spaced apertures 133 in which are disposed the latch balls 134 movable between outer positions wherein their outer portions extend into an internal annular latch recess 136 of the pull sleeve when aligned with the latter, as shown in FIGURE 3, and inner portions wherein inner portions of the balls extend into an external annular lower latch recess 138 of the control prong adjacent the lower end thereof when the control prong latch recess is aligned with the latch balls as illustrated in FIGURE 8.

Figure 3:
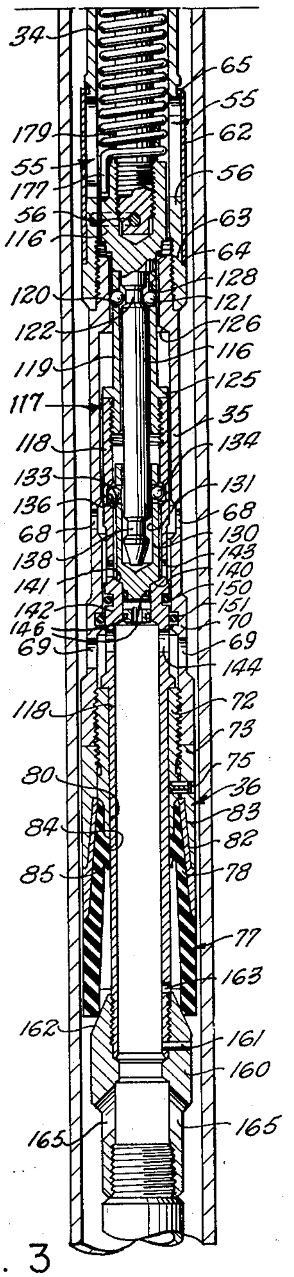
FIGURE 3 is a view similar to FIGURE 2, being a continuation thereof, and showing the lower portions of the anchoring and sealing device.

It will thus be seen that the control prong may move upwardly relative to the bypass plug from the position illustrated in FIGURE 3 until its lower latch recess 138 is aligned with the latch balls 134 of the bypass plug which thereupon enter into the lower latch recess due to their camming engagement with the downwardly and outwardly sloping upper shoulder of the latch recess 136 of the pull sleeve and that further upward movement of the control prong will cause the bypass plug to move upwardly therewith until its upper end engages the lower end of the sleeve extension as illustrated in FIGURE 8.

The lower end of the bypass plug is of reduced diameter and provides a downwardly facing stop shoulder 140 engageable with the upwardly facing shoulder 141 of the internal flange 142 of the pull sleeve disposed between the upper and lower lateral ports 143 and 144, respectively, of the pull sleeve.

The bypass plug is provided with O-rings 146 or other seal means disposed in suitable annular recesses on opposite sides of a transverse passage 147 of the reduced lower portion of the bypass plug which seal between the pull sleeve and the bypass plug when the bypass plug is in the lower position in the pull sleeve illustrated in FIGURE 3 so that the bypass plug may close the longitudinal bore of the pull sleeve. A longitudinal downwardly opening passage 148 of the bypass plug communicates with the transverse passage 147 so that fluid flow may take place between the longitudinal bore or flow passage of the pull sleeve and the exterior thereof above the internal flange 142, when the bypass plug is in the upper position illustrated in FIGURE 8, through the longitudinal and transverse passages 148 and 147 of the bypass plug and the upper lateral port 143 of the pull sleeve.

The pull sleeve is provided with an external annular recess located between its lateral ports 143 and 144 in which is disposed an O-ring 150 or other suitable seal means which seals between the pull sleeve and the bypass mandrel. The bypass mandrel is similarly provided with an internal annular recess in which is disposed an O-ring 151, or other suitable seal means, located above its lateral ports 69 whereby the O-rings 150 and 151 seal above the ports 69 and 144 of the outer tubular member and the pull sleeve, respectively, when the pull sleeve is in the lower position illustrated in FIGURE 3, and which seal between the pull sleeve and the bypass mandrel above and below the lower lateral ports 144 of the pull sleeve when the pull sleeve is in the upper position illustrated in FIGURES 5 and 8.

The lower core member section 117 includes a seal expander 160 threaded on the lower end of the pull sleeve and secured against rotational movement with respect thereto by a pin 161. The seal expander has an annular downwardly and outwardly extending wedge surface 162 adapted to enter into the lower end of the tubular seal 77 to expand it into sealing contact with the tubing string T when the pull sleeve is moved to the upper position illustrated in FIGURES 5 and 8. The pull sleeve is provided with a lateral vent port 163 above the seal expander to permit escape of fluids from between the pull sleeve and the seal 77 as the seal expander moves upwardly into the packer. The seal expander is provided with lateral ports 165 which provide communication with the interior of the tubing string T below the packer.

Figure 1:
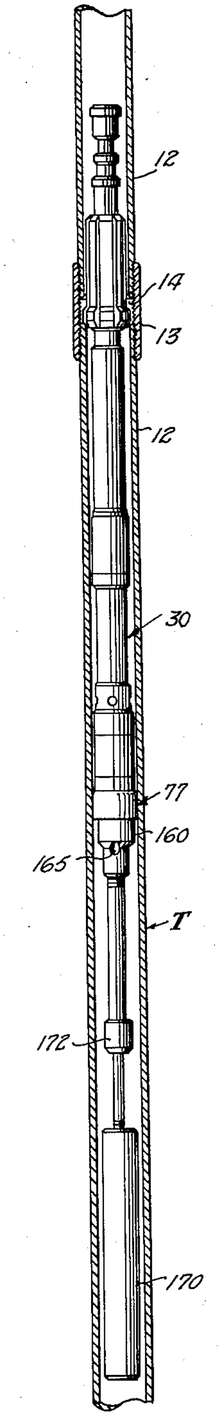
FIGURE 1 is an elevational view of the anchoring and sealing device embodying the invention anchored in a well flow conductor and supporting a jar sensitive well device.

Any desired well device such as the pressure bomb or pressure recording device 170 may be secured to the pull sleeve by means of the internally threaded lower portion of the seal expander 160. As illustrated in FIGURE 1, a pressure sensing and recording device or "pressure bomb" 170 is shown connected to the seal expander by means of a shock absorbing device 172 connected to and interposed between seal expander and the pressure bomb.

It will now be apparent that the core member includes an upper section 88 comprising the fishing neck 90, the control core 100 rigidly connected to the lower end of the fishing neck, and the control prong 116 rigidly connected to the lower end of the control core, and a lower section 117 which is capable of limited longitudinal movement relative to the upper section and comprises the sleeve extension 119, the pull sleeve 118 and the seal expander 160. The upper section is free to rotate relative to the lower section.

The upper section of the core member is biased for rotation in a counter-clockwise manner, when viewed from above, relative to the outer tubular member or mandrel by a spring 175 disposed in the spring housing and having an upper upwardly longitudinally extending end portion 176 received in an external longitudinal slot in the lower end portion of the expander mandrel 33. The lower downwardly longitudinally extending end portion 177 of the spring is received in a longitudinally extending external slot in the upper end portion of the control prong 116. The expander mandrel and the control prong are provided with reduced sleeves 178 and 179, respectively, which extend into opposite ends of the spring to hold the spring properly positioned about the control core 100.

Figure 2:
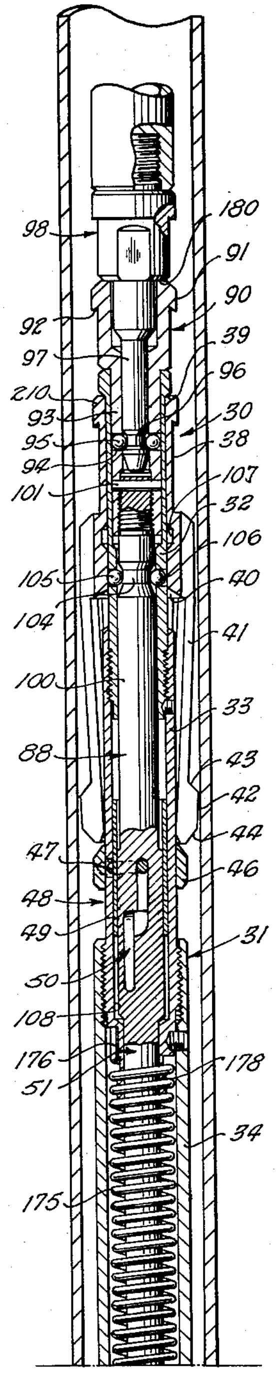
FIGURE 2 is a view, partly in elevation and partly in section, with some parts broken away, of the upper portions of an anchoring and sealing device and of a running tool showing the device and the running tool as they appear while the device is being lowered through a well flow conductor by means of the running tool.

In use, the anchoring and sealing device 30 is assembled to place the spring under torsional forces to cause it to exert the force which tends to rotate the control core in a counter-clockwise direction relative to the outer tubular member 31 by first assembling the various elements of the device in the positions illustrated in FIGURES 2 and 3 with the exception of the upper and lower control pins 47 and 56 which are left out and the housing sleeve 62 which is displaced upwardly of the guide slots 55 of the spring housing. The fishing neck 90, control core 100 and control plunger 116 are then rotated two turns in a clockwise direction, as viewed from above, with respect to the outer tubular member 31 and the pins are then inserted in the positions illustrated in FIGURES 2 and 3. The spring 175 then exerts a force which tends to cause counter-clockwise rotation of the upper section 88 of the core member 51 relative to the outer tubular member. The housing sleeve 62 is then moved to the position illustrated in FIGURE 3 and staked against movement on the spring housing.

In use, the running tool 98 is connected to a flexible line through any suitable additional equipment and its lower reduced portion is inserted into the fishing neck while the fishing neck is in an upper position relative to the collet mandrel 32 so that the latch balls 95 of the fishing neck may move outwardly and not obstruct the central bore of the fishing neck until the latch recess 96 of the fishing tool is aligned with the balls which are then free to move inwardly thereinto. The downwardly facing annular shoulder 180 of the running tool limits telescoping inward movement of the running tool into the fishing neck when the external latch recess 96 thereof is aligned with the balls. The fishing neck is then moved inwardly into the collet mandrel 32 which is then being held in an upper position relative to the collet 38 so that its latch balls 105 are in alignment with the internal latch recess 107 of the collet. The control core 100 may then be positioned in the collet mandrel with its external latch recess 104 positioned above the latch balls 105 of the collet mandrel which move outwardly into the internal latch recess 107 of the collet to permit such movement of the control core into the collet mandrel. The fishing neck, the control core and the control prong are then telescoped inwardly into the inner tubular member to cause the external latch recess 104 of the control core 100 to move into alignment with the latch balls 105 whereupon the collet may be moved upwardly on the collet mandrel, the latch balls moving inwardly due to the camming action of the upwardly facing lower shoulder of the internal latch recess of the collet. The core member 51 is then in the position illustrated in FIGURES 2 and 3 with the upper control pin 47 disposed in the upper end of the upper longitudinal slot portion 110 of the guide slot 50 of the control core and in the lateral transverse portions 53 of the guide slots 48 of the expander mandrel 33 as shown in FIGURE 12. The lower transverse pin 56 of the core member 51 is then disposed adjacent the lower ends of the lower longitudinal portions 59 of the slots 55 of the spring housing as indicated by the solid line position thereof in FIGURE 6. The collet fingers 41 are then disposed above the expander member 46 so that the collet fingers are free to flex inwardly toward the expander housing, as shown in FIGURE 2.

The bypass plug 130 is in the position illustrated in FIGURE 3 wherein the opposite ends of the transverse passage 147 are closed due to the action of the seal means or O-rings 146 which seal between the internal flange 142 of the pull sleeve and the bypass plug. Fluid flow may take place from below to above the seal 77 through the lateral ports 165 of the seal expander 160, the longitudinal bores of the seal expander and the pull sleeve 118, and the lateral ports 144 and 69 of the pull sleeve and of the bypass mandrel 35 which are now in communication with one another. The O-rings 150 and 151 prevent flow of fluids between the pull sleeve and the bypass mandrel above the lateral ports 144 and 69.

The engagement of the latch balls 95 of the fishing neck 90 now prevents relative longitudinal movement between the fishing neck and the running tool whereby the running tool may releasably support the anchoring and sealing device. The well devices 170 and 172 are connected to the packer expander 160.

The anchoring and sealing device is then lowered through the tubing string, the collet fingers 41 flexing inwardly each time the lower cam shoulder 44 of the bosses 42 meet such upwardly facing obstructions as the upper ends of the tubing sections 12 to permit downward movement past the obstructions. The collet mandrel is held against downward movement on the control core due to the engagement of the latch balls 105 in the external recess 104 of the control core 100 since the collet is maintained in an upper position on the collet mandrel due to the frictional engagement of its bosses 42 with the internal wall surfaces of the tubing string through which the anchoring and sealing device is being lowered.

When the location in the tubing string is reached at which it is desired to locate the anchoring and sealing device, which location is always at a collar recess, the bosses 42 move outwardly into such collar recess and the downward movement of the anchoring and sealing device is halted. An upward pull is then exerted on the running tool to cause the outer tubular member and both sections of the core member 51 to move upwardly relative to the collet 38 to a position wherein the upper end of the expander mandrel 33 abuts the downwardly facing internal shoulder 40 of the collet and the collet expander 46 is positioned inwardly of the lower ends of the collet fingers 41 and locks the bosses 42 in their expanded positions in the selected collar recess. The upper shoulder of the collet expander 46 slopes downwardly and outwardly to facilitate its movement upwardly relative to the lower ends of the collet fingers and to expand them into fully expanded positions in the event that the resilience of the collet fingers has not done so.

This upward movement of the outer tubular member relative to the collet moves the latch balls 105 of the collet mandrel 32 into alignment with the internal annular latch recess 107 of the collet whereby the continued upward pull exerted on the fishing neck through the usual flexible line now causes both sections of the core member 51 to move upwardly in the outer tubular member since the downwardly and outwardly extending lower shoulder defining the external latch recess 104 of the control core 100 may now cam the latch balls 105 of the collet mandrel outwardly into the latch recess 107 of the collet and thus permit upward movement of the control core 100 relative to the collet mandrel. The collet mandrel is now held against longitudinal movement relative to the collet, and therefore to the tubing string since the latch balls now extend into the collet latch recess. Such upward movement of the core member 51 causes the upper control pin 47 to assume the position illustrated in FIGURE 13 relative to the guide slots 48 and 50 wherein the pin is located in an intermediate portion of the upper longitudinal portion 110 of the guide slot 50 of the control core 100 and in the lateral transverse portions 53 of the cooperating guide slots 48 of the expander mandrel 33. Simultaneously the lower transverse pin 56 moves upwardly in the lower longitudinal sections 59 of the slots 55 to the position 56*a*.

When the various elements of the packing and control assembly are in these positions, the outer tubular member is securely locked against movement in the tubing string T so that the tubing may be safely plugged.

To plug the tubing, the upward pull on the running tool is continued to move both sections of the core member 51 further upward relative to the tubular member 31. Such upward movement of the core member 51 relative to outer tubular member moves the seal expander 160 into the lower end of the seal 77 which is expanded thereby into sealing engagement with the internal wall surfaces of the tubing and simultaneously the lateral ports 144 of the pull sleeve are positioned between the O-rings 150 and 151 which seal between the pull sleeve and the bypass mandrel. The ports 144 and 69 of the pull sleeve and of the bypass mandrel are thus prevented from communicating with one another and, since the O-ring 150 seals between the pulling sleeve and the bypass mandrel below the upper lateral ports 68 of the bypass mandrel, the tubing T is now plugged and no fluid flow may take place through the tubing string past the anchoring and sealing device.

Such upward movement is continued until upward movement of the core member 51 is stopped by the engagement of the upwardly facing annular shoulder 182 of the pull sleeve with the downwardly facing internal shoulder 183 of the bypass mandrel. The latch balls 121 of the sleeve extension are now positioned above the upper end of the bypass mandrel and are free to move outwardly from the latch recess 122 of the control prong whereby the upper section 88 of the control member is now free to move upwardly relative to the lower section 117. The latch balls 134 of the bypass plug however are still positioned above lower external recess 138 of the control prong so that the control prong may still move upwardly a certain distance without permitting or causing upward movement of the bypass plug. At this time the lower control pin 56 has been moved to the position indicated by the numeral 56*b* in FIGURE 6 at the upper portion of the lower longitudinal portion 59 of the lower control slot and almost in alignment with the transverse portion 60 thereof. The control core 100 has moved still further upward relative to the expander housing and to the upper control pin 47 to cause the upper transverse pin 47 to be located, as shown in FIGURE 14, in the lower end of the upper longitudinal portion 110 of the slot 50 of the control core and still in the lateral transverse portions 53 of the slots 48 of the expander mandrel. The running tool 98 has not moved relative to the fishing neck so that the latch balls 95 of the fishing neck still latch the fishing neck to the running tool 98.

A further upward pull imparted to the running tool 98 now moves the upper section 88 of the core member to position the downwardly facing shoulder 114 of the slot 50 above the upper control pin 47. Simultaneously the lower control pin 56 has been moved upwardly in the lower longitudinal portions 59 of the slots 55 to and in alignment with the transverse sections 60 of the slots so that the upper section 88 of the core member 51 is now free to rotate in a counter-clockwise manner, as seen from above, until the transverse pin 47 assumes the position illustrated in FIGURE 15 wherein the pin engages the side 185 of the slot 50 and the lower control pin 56 is in the position 56*c* engaging the side surfaces 186 of the slots 55. The control pin thus prevents further rotational movement of the core member relative to the outer tubular member. Clearance is provided between downwardly facing shoulder 114 of the slot 50 and upper control pin 47 to avoid possible interference to rotation of control core 100 within the outer tubular member because, with pressure below the device, upper control pin 47 will be held by the inward force of the collet dogs. Engagement of the upper control pin 47 with the downwardly facing shoulder 114 of the slot 50 of the control core 100 and with the downwardly facing shoulders 187 of the expander mandrel defining the upper ends of the substantially L-shaped slots 48 will now prevent downward longitudinal movement of the core 100 relative to the expander mandrel and simultaneously the engagement of the outwardly facing shoulders 188 defining the lower edge of the transverse portion 60 of the slots 55 with the lower control pin 56 also prevents downward movement of the control core 100 relative to the outer tubular member so that the anchoring and sealing device is now locked in the tubing string. The seal expander cannot be moved downwardly out of expanding engagement with the seal 77 since the core member may not now be moved downwardly in the outer tubular member. The bypass plug 130 is locked against upward movement due to the engagement of its latch balls 134 in the internal annular recess 136 of the pulling sleeve. The control pin 47, and therefore the collet expander, in turn is held against downward movement relative to the outer tubular member by its engagement with the upwardly facing shoulders 189 of the L-shaped slots 48. As a result the pull sleeve 118 and the bypass plug 130 are held in the operative positions illustrated in FIGURES 4 and 5 and close off the tubing string. At this time, the fishing neck 90 extends outwardly of the collet mandrel 32 with the balls 95 thereof positioned slightly below the upper end of the collet mandrel and still in latching engagement in the external latch recess 96 of the prong 97 of the running tool 98.

The running tool may now be displaced upwardly out of engagement with the anchoring and sealing device for removal from the tubing string by continuing the upward pull on the flexible line to which it is connected. Such further upward pull now causes the fishing neck 90 and the upper section 88 of the core member 51 to move upwardly relative to the outer tubular member 31 until the fishing neck is moved out of the upper end of the collet mandrel 32 whereupon the balls 95 are free to move outwardly and are cammed outwardly by the downwardly and outwardly extending lower shoulder defining the lower end of the latch recess 96 to free the running tool from anchoring and sealing device. During such upward movement of the upper section of the core member, the control pin 47 is positioned as shown in FIGURE 16 in the slot 50 while the control pin 56 moves to the position 56*d*. Once the running tool is removed, the upper section again moves downwardly so that the balls 95 are again positioned within the collet mandrel slightly below the upper end of the collet mandrel as shown in FIGURE 4 and the control pin 47 is once again in the position illustrated in FIGURE 15 while the control pin 56 returns to the position 56*c*.

Figure 4:
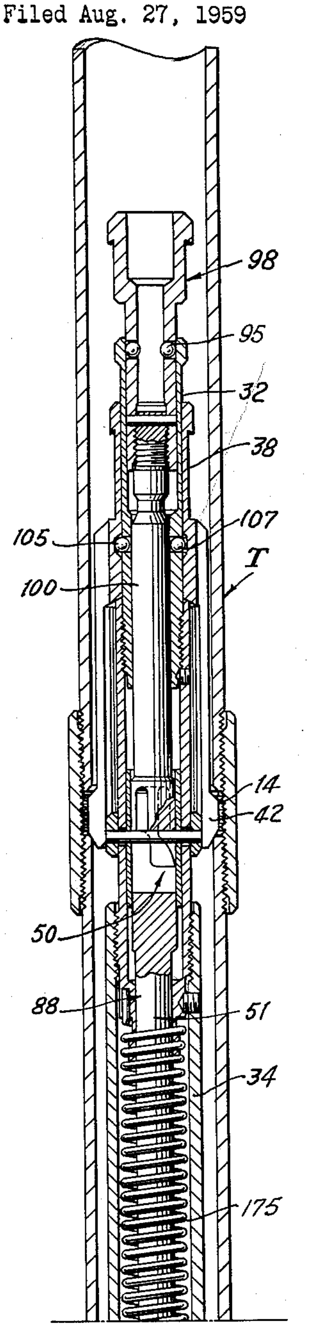
FIGURE 4 is a view, partly in section and partly in elevation, of the upper portions of the anchoring and sealing tool showing the device in anchored and sealing position in a well flow conductor.
Figure 5:
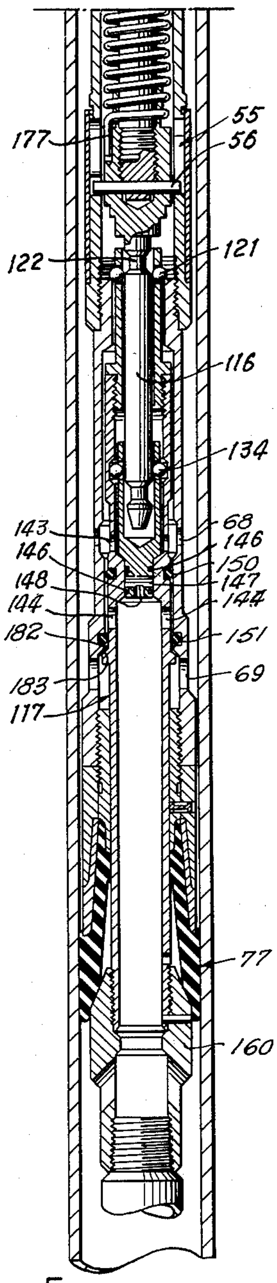
FIGURE 5 is a view similar to FIGURE 4, being a continuation thereof, showing the lower portions of the anchoring and sealing device.

The various elements of the anchoring and sealing device 30 are then in the positions illustrated in FIGURES 4 and 5. The anchoring and sealing device then holds the well device, such as the pressure bomb 170 in the tubing string with the tubing string being sealed off against flow of fluids in either direction above the pressure bomb so that the pressure bomb will detect and record the actual pressure within the tubing string below the anchoring and sealing device. No movement of the elements of the core member can now take place since the spring 175 biases the upper section of the core member in a counter-clockwise direction and the shoulders 189 and 186 of the slots 48 and 55, respectively, engage the control pins. The core member thus cannot be moved until it is first moved upwardly in the outer tubular member as will be explained below.

It will be noted that during the lowering, anchoring, plugging, and running tool released operations performed on and with the anchoring and sealing device, no jars, either upward or downward, are imparted either to the running tool or to the anchoring and sealing device so that the pressure bomb 170 or any other well device which may be secured to the anchoring and sealing assembly is not subjected to jars or shocks which might impair its accuracy or even damage it, all movement of the elements of the anchoring and sealing device during such operations being effected by continuous pulls of substantially constant force applied to the core member.

When it is desired to remove the well device 170 and the anchoring and sealing device from the tubing string, it is necessary that the pressure above and below the anchoring and sealing device be equalized so that the seal expander may be more easily moved downwardly from the seal 77 since the pressure below the seal is now forcing the seal expander into the seal. In order to equalize the pressure across the anchoring and sealing device and to remove the device from the well flow conductor, a pulling tool 200, which may be substantially of the type disclosed in the patent to Marshall et al., 2,605,131, is lowered into the tubing string by means of the usual flexible line. The pulling tool has a plurality of dogs 201 movably confined between a core 202 and a sleeve 203. The dogs have upper hook portions 204 received in upper slots 205 of the sleeve and have lower potrions extending through elongate slots 206 of the sleeve. The lower ends of the dogs are provided with inwardly extending hooks 207 adapted to engage the undercut shoulder 92 of external flange 91 at the upper end of the fishing neck 90.

The pulling tool 200 is lowered through the tubing string until the lower portion of its sleeve 203 telescopes over the upper end of the fishing neck and the hooks on the lower ends of the dogs move inwardly to engage the undercut annular shoulder of the fishing neck. An upward pull is then exerted on the fishing neck to cause the upper section 88 of the core member to move upwardly relative to the outer tubular member and also relative to the pulling sleeve 118 and the bypass plug 130. Upward movement of the upper section relative to the pulling sleeve now causes the latch recess 138 of the control prong to move into alignment with the latch balls 134 of the bypass plug so that the latch balls may now move inwardly out of the internal latch recess 136 of the pulling sleeve upon further upward movement of the control prong in the pulling sleeve. The upper section is pulled upwardly until the control pin 47 is positioned in the lower longitudinal portion 111 of the slot 50 and in the transverse portions 53 of the slots 48 of the expander mandrel 33 as illustrated in FIGURE 17 When the control prong moves to the position relative to the bypass plug 130 wherein its latch recess is aligned with the latch balls 134 of the bypass plug, the upwardly acting pressure in the longitudinal bore of the pulling sleeve below the bypass plug moves the bypass plug upwardly. The upwardly and inwardly inclined shoulder defining the latch recess 136 of the pulling sleeve cams the balls inwardly into the latch recess 138 of the control prong. As a result, the bypass plug 130 moves upwardly with the prong since the engagement of the latch balls 134 in the lower latch recess of the control prong prevents movement of the plug relative to the control prong until its transverse passage 148 communicates with the lateral ports 143 and 68 of the pulling sleeve and of the bypass mandrel whereupon fluid may escape upwardly from the tubing string through the ports 165 of the packer expander 160 into the bore of the pulling sleeve and thence upwardly through the downwardly opening longitudinal passage 148 and the transverse passage 147 of the bypass mandrel to equalize the pressure above and below the anchoring and sealing device and across the seal 77. The control pin 56 moves with the upper section to the position **56*e* in the upper lateral portions of the slots 55, the engagement of the transverse pin 56 in the upper longitudinal portions 58 of the slots 55** preventing rotational movement of the upper section of the core member relative to the outer tubular member during such upward movement of the upper section.

After the pressure has been equalized a continuous upward pull exerted on the fishing neck 90 moves the upper section in the outer tubular member until the control pin 47 assumes the position illustrated in FIGURE 18 wherein it is in the lower end of the lower longitudinal portion 111 of the guide slot 50 and is still maintained in the transverse lateral portion 53 of the slot 48. The lower control pin 56 simultaneously moves to the position **56*f* at the upper ends of the upper longitudinal portions 57 of the slots 58. When the control pins are in these positions, the spring 175 causes the upper section to rotate in a counter-clockwise direction as seen from above until the control pin 47 assumes the position illustrated in FIGURE 19 and the transverse pin 56 assumes the position 56*g* whereupon further rotation of the core member 51** relative to the outer tubular member is prevented.

The control pin 47 is now so positioned in the guide slots 48 and 50 as to permit downward movement of the upper section relative to the outer tubular member. Tension on the flexible line is then relaxed to permit the spring 175 which was compressed when the upper section was moved upwardly relatively to the outer tubular member, to move the core member downwardly relative to the outer tubular member. As a result, the force of the spring 175 is now effective to move the upper section of the core member to the positions illustrated in FIGURES 2 and 3 wherein the seal expander is below and out of engagement with the seal 77 and the seal moves resiliently out of sealing engagement with the tubing string. The control pin 47 moves to the position illustrated in FIGURE 20 wherein it is located in the lower end of the longitudinal portions 52 of the slot 48 of the expander mandrel and in engagement with the downwardly facing shoulder 114 of the control core 100. The upper section of the core member therefore moves the pin 47 and the collet expander downwardly relative to the collet until such downward movement of the pin 47 is arrested by its engagement with the edge defining the lower end of the longitudinal portion 52 of the slot 48. The lower control pin 56 permits such downward movement of the upper section since it now is free to move downward in the longitudinal portions **55*a* of the slots 55 from the position 56*g* to the position 56*h*. The collet expander is now positioned below and out of engagement with the lower ends of the collet fingers, and the bosses are free to move inwardly when their upper shoulders 43 meet such downwardly facing obstructions as the lower ends of tubing sections at the collar recesses whereby an upward pull now imparted to the pulling tool will cause the anchoring and sealing device to move upwardly in the tubing string carrying the pressure bomb 170** therewith, as shown in FIGURE 11, the force of the biasing spring resisting further upward movement of the upper section relative to the outer tubular member.

It will again be noted that all operations performed with the pulling tool 200 which include the equalization of the pressures above and below the seal or sealing member 77 accomplished by the upward movement of the bypass plug, the subsequent downward movement of the seal expander 160 out of expanding position relative to the seal and the downward movement of the collet expander 46 relative to the collet 38 are all accomplished by a continuous upward pull and its subsequent relaxation without jarring being imparted to the fishing neck 90. The downward movement of the pulling sleeve due to the action of the spring 175 relative to the packer 77 and the outer tubular member is also uniform and without shock or jars being imparted to the pulling sleeve since a slow even release is made of the upward tension on the flexible line so that the pressure bomb is not jarred or subjected to any shocks during the removing operations of the anchoring and sealing device.

Figure 6:
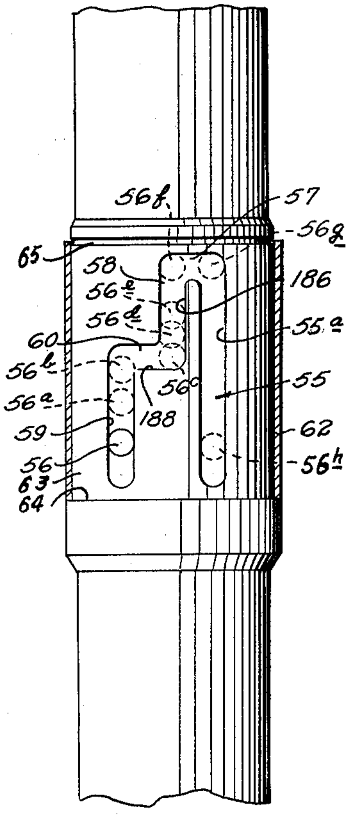
FIGURE 6 is a fragmentary enlarged side elevational view illustrating the various positions assumed by a control pin of one of the elements of the anchoring and sealing device in a slot of another of the operative elements of the anchoring and sealing device during anchoring and releasing operations.

It will now be seen that the sequence of operations during use of the anchoring and sealing device includes locating the anchoring and sealing device at a preselected collar recess of the locating recess; locking the anchoring means or collet bosses 42 in the recess by means of the collet expander 46; expanding the seal 77 and placing the ports 69 and 144 out of communication with one another to plug or close the well flow conductor at the preselected location which steps of operation can take place only while the collet is in locked position; releasing the running tool which step of operation can take place only when the pin 56 has moved past its set position 56c; lowering a pulling tool to engage with the anchoring and sealing device and move the bypass plug 130 to its open flow to permit an equalization of pressures across the seal 77, the anchoring and sealing device being securely locked against displacement from its predetermined location until the bypass plug has been moved to its open position; disengaging the seal expander 160 and unlocking the collet fingers for inward movement but only after the pressure is equalized across the seal 77 since the control pin 47 can reach the position illustrated in FIGURE 20 only after the bypass plug has been moved to open position and then moved back to its original closing position and the ports 69 and 144 again placed in communication with each other; and removing the anchoring and sealing device by means of a pulling tool when the anchoring and sealing device is free to fall in the tubing string to the extent permitted by the pulling tool and the flexible line to which it is attached when the pin 56 reaches the position 56h illustrated in FIGURES 6 thus indicating positively that the anchoring and sealing device is ready to be removed from the flow conductor.

It will be apparent that the collet expander 46 stays in its upper position due to the engagement of pin 47 with the upper lateral portion of slot 48 until the downwardly facing shoulder 114 of slot 50 of the control member 100 moves the upper control pin 47 to the lower end of slot 48, as shown in FIGURE 20, so that the anchoring and sealing device is positively locked preventing removal of the anchoring and sealing device until the full sequence of operations has been performed.

It will further be seen that the configurations of the slots 48 and 50 and their relationships as illustrated in FIGURES 12 to 19 are for the purpose of permitting the lower control pin 56, in cooperation with its slot 55, to positively control the entire cycle of operation of the anchoring and sealing device.

It will further be seen that the pin 56 must follow slot 55 as it is motivated by the upward pull on the flexible line to which the running and pulling tools are attached, the rotational force of the spring and the downward force of the spring, such forces being kept under the control of the pin 47 operating in slots 48 and 50 and that the movement of the pin 56 in slot 55 controls the sequence of operations brought about by moving the control core up and down in the mandrel.

It will further be seen that the anchoring and sealing device is easily and simply operated by merely lowering the anchoring and sealing device into the well flow conductor by means of a running tool suspended on the flexible line, taking an upward strain on the flexible line until the running tool pulls free, lowering a pulling tool when it is desired to move the anchoring and sealing device from the well flow conductor until the anchoring and sealing device is engaged by the pulling tool, taking an upward strain on the flexible line to which the pulling tool is connected, relaxing the strain on the flexible line and finally lifting the pulling tool and the anchoring device to the surface.

It will now be seen that a new and improved anchoring and sealing device for releasably securing well devices in a well flow conductor without subjecting the well devices to jars or shocks during anchoring or releasing operations in a well flow conductor has been illustrated and described which includes an outer elongate tubular member 31 having a seal 77 at its lower end and having a locking device, such as the collet 38, at its upper end for locating and locking the outer tubular member 31 at a selected coupling recess of a well flow conductor.

It will further be seen that the anchoring and sealing device includes an elongate core member 51 having an upper section 88, formed of the fishing neck 90, the control core 100 and the control prong 116, connected to a lower control pin 56, and having a lower section formed of the sleeve extension 119, the pulling sleeve 118 and the packer expander 160 which are secured to the control prong for limited longitudinal movement relative thereto by means of the extension sleeve latch balls 121 whereby the seal expander may be selectively moved into and out of operative engagement in the seal.

It will also be seen that a bypass plug 130 movably mounted in the pull sleeve is allowed to move upwardly by the control prong to permit equalization of pressure across the seal 77 after upward movement of the pulling sleeve and the packing expander 160 is arrested by the engagement of the cooperating stop shoulders thereon.

It will further be noted that the collet lock or expander 46 is movable downwardly on the expander mandrel only when the upper section of the core member has rotated to place the downwardly facing shoulder 114 of the control core in engagement with the upper control pin 47 and the upper control pin is aligned with the longitudinal portion 52 of the slots 48 of the outer tubular member and that the transverse pin is mounted on a sleeve 49 which is movable longitudinally and rotatably in the outer tubular member.

It will further be seen that a lower control pin 56 extends into substantially U-shaped slots 55 of the outer tubular member having intermediate upwardly facing shoulders 188 which control downward movement of the control core 100 and the prong 116 relative to the outer tubular member whereby downward movement of the core member 51 is limited during installation operations to prevent downward movement of the collet expander on the outer tubular member and out of engagement with the collet and which permits full downward movement of the inner core member 51 relative to the outer tubular member only after the core member has been moved to an extreme upward position relative to the outer tubular member and the core member has rotated to an extreme counter-clockwise position as seen from above.

It will further be seen that the bypass plug 130 is moved upwardly to a pressure equalizing postion upon upward movement of the upper section of the core member relative to the tubular outer member or mandrel from its normal operative position and that its downward movement to move the collet expander and the packer expander downwardly to permit upward removal of the anchoring and sealing assembly can take place only after such upward pressure equalizing movement.

It will further be noted that the core member is provided with an upper section which is longitudinally movable to a limited degree relative to its lower section whereby the lower section on which the expander is mounted may first be moved upwardly with the upper section and into expanding engagement with the seal 77 and then left stationary while the upper section of the core member is subsequently moved upwardly to move the bypass plug 130 upwardly to open position to permit equalization of pressure in the well flow conductor above and below the packer prior to the subsequent downward movement of the upper section to cause downward movement of the lower section and the consequent disengagement of the seal expander 160 from expanding position in the seal which thereupon ceases to seal between the anchoring and sealing device and the well flow conductor.

It will further be noted that the outer tubular member is provided with a plurality of upper ports and a plurality of lower ports, the lower ports communicating with lateral ports of the core member to afford fluid communication through the lower portions of the core member past the seal 77 during downward movement of the anchoring and sealing device in the well flow conductor and that the upward movement of the lower section of the core member which causes the seal expander to move into the seal and expand it into sealing engagement with the well flow conductor causes the lateral ports of the lower section to be sealed from the lower lateral ports of the outer tubular member whereby flow of fluids in the well flow conductor past the anchoring and sealing device is prevented.

It will further be seen that the outer tubular member is also provided with upper lateral ports which are in communication with upper ports of the lower portion of the core member and that a bypass mandrel closes the bore of the lower portion of the core member below such upper lateral ports of the lower section of the core member when the packer expander is in operative engagement in the packer and that the bypass plug may be moved upwardly to permit communication between the bore of the lower portion of the core member to permit fluid to flow in the well flow conductor from below the packer to thereabove.

It will further be seen that due to the provision of the appropriately shaped slots 50, 48 and 55 and the provision of the spring 175 which biases the core member for counter-clockwise rotation relative to the outer tubular member, the outer tubular member and the core member may be initially moved upwardly relative to the collet 38 to cause the collet expander or lock to move into locking engagement with the collet to prevent its fingers from flexing inwardly to prevent its bosses 42 from moving inwardly and out of engagement with a suitable internal recess of a well flow conductor, then move upwardly to cause the seal expander to move into the seal and simultaneously interrupt communication between a pair of bypass ports which permit flow of fluids through the lower portions of the anchoring and sealing device past the seal during lowering operations of the anchoring and sealing device in the well flow conductor, then permit upward movement of the bypass mandrel to equalize the pressures above and below the seal and finally permit the seal expander to be moved downwardly out of expanding engagement with the seal and the collet expander to be moved downwardly out of engagement with the collet to permit the bosses 42 of the collet to move inwardly out of the locking recess of the well flow conductor to thus permit removal of the anchoring and sealing device from the well flow conductor.

In order to again prepare the anchoring and sealing device to again anchor a well device 170 in a well flow conductor and seal or plug the well flow conductor thereabove, the following procedure may be followed; first, the core member 51 is moved upwardly in the outer tubular member until the upper control pin 47 is in the position illustrated in FIGURE 19 and the control pin 56 is in its position 56*g*; second, the running tool 98 is inserted in the fishing neck 90; third, the running tool and the core member are rotated in a clockwise direction, as seen from above, in the outer tubular member until the upper control pin assumes the position illustrated in FIGURE 18 and the lower control pin assumes the position 56*f*; fourth, the spring 175 is permitted to move the pulling tool and the core member downwardly in the outer tubular member until the upper control pin assumes the position illustrated in FIGURE 15 and the lower control pin assumes its position 56*c*; and fifthly, the core member is rotated in a clockwise manner in the outer tubular member and then the spring 175 is permitted to move the running tool and the inner core member downwardly in the outer tubular member until the upper control pin assumes the position illustrated in FIGURE 12 and the lower control pin is in the position indicated by the solid line in FIGURE 6 whereupon the anchoring and sealing device may again be employed to anchor a well device in a well flow conductor and plug or seal the well flow conductor thereabove.

It will thus be apparent that once the anchoring and sealing device has been assembled and the spring 175 has been placed under a torsional force, the anchoring and sealing device may be used repeatedly to anchor and remove the well devices in and from a well flow conductor without requiring disassembly of the anchoring and sealing device.

The foregoing description of the invention is explanatory only, and changes in the details of the construction illustrated may be made by those skilled in the art within the scope of the appended claims.

What is claimed and desired to be secured by Letters Patent is:

1. An anchoring and sealing device for use in a well flow conductor having an internal recess including: a tubular mandrel; anchoring means mounted on the mandrel and movable outwardly to expanded position in the internal recess of the well flow conductor, said anchoring means being mounted on the mandrel for limited longitudinal movement thereon; lock means mounted on the mandrel for limited longitudinal movement thereon and movable with the mandrel upon upward movement of the mandrel relative to the anchoring means into locking engagement with the anchoring means when the anchoring means is in its expanded position to lock the anchoring means in the internal recess of the well flow conductor; a control member mounted in the mandrel for limited longitudinal movement relative to the mandrel extending longitudinally of the mandrel and having an upper end portion engageable by running and pulling tools whereby longitudinal movement may be imparted to the control member relative to the anchoring means when the anchoring means is received in the annular recess of the well flow conductor; seal means carried by the mandrel for sealing between the mandrel and the well flow conductor; expander means carried by the control member and movable into engagement with the seal means to expand the seal means into sealing engagement with the well flow conductor after the anchoring means has been locked into expanded position, said control member being movable by the application of a continuous constant upward force thereto to move the mandrel and the control member upwardly relative to the anchoring means to cause the lock means to move into engagement with the anchoring means to lock the anchoring means in its expanded position and subsequently to move the control member upwardly to move the expander means into engagement with the seal means, said mandrel and said control member having cooperable pin and slot means operatively connecting said mandrel and said control member for limited movement relative to each other longitudinally and rotatively about their longitudinal axes, said pin and slot means having means thereon coacting to position said mandrel and said control member in a plurality of predetermined longitudinally spaced and rotatively displaced positions with respect to each other; means biasing said mandrel and said control member for rotatable movement about their longitudinal axes relative to each other; said cooperable pin and slot means being engageable upon rotation of the control member in one direction through a predetermined angle relative to the mandrel to prevent downward movement of the control member and the expander means relative to the seal means after the expander means has moved the seal means into expanded sealing positions, the mandrel, the control member end the expander means having a flow passage affording communication with the well flow conductor above and below the sealing means; and plug means for closing said passage when the expander means is in seal expanding position, the control member being operatively connected to the plug means for moving the plug means upwardly to open position upon upward movement being imparted to the control member after the expander means has been moved to its seal expanding position whereby the pressure above and below the seal means may be equalized.

2. An anchoring and sealing device for use in a well flow conductor having an internal recess including: a tubular mandrel; anchoring means mounted on the mandrel and movable outwardly to expanded position in the internal recess of the well flow conductor, said anchoring means being mounted on the mandrel for limited longitudinal movement thereon; lock means mounted on the mandrel for limited longitudinal movement thereon and movable with the mandrel upon upward movement of the mandrel relative to the anchoring means into locking engagement with the anchoring means when the anchoring means is in its expanded position to lock the anchoring means in the internal recess of the well flow conductor; a control member mounted in the mandrel for limited longitudinal movement relative to the mandrel extending longitudinally of the mandrel and having an upper end portion engageable by running and pulling tools whereby longitudinal movement may be imparted to the control member relative to the anchoring means when the anchoring means is received in the annular recess of the well flow conductor; seal means carried by the mandrel for sealing between the mandrel and the well flow conductor; expander means carried by the control member and movable into engagement with the seal means to expand the seal means into sealing engagement with the well flow conductor after the anchoring means has been locked into expanded position, said control member being movable by the application of a continuous constant upward force thereto to move the mandrel and the control member upwardly relative to the anchoring means to cause the lock means to move into engagement with the anchoring means to lock the anchoring means in its expanded position and subsequently to move the control member upwardly to move the expander means into engagement with the seal means, said mandrel and said control member having cooperable pin and slot means operatively connecting said mandrel and said control member for limited movement relative to each other longitudinally and rotatively about their longitudinal axes, said pin and slot means having means thereon coacting to position said mandrel and said control member in a plurality of predetermined longitudinally spaced and rotatively offset positions with respect to each other, said cooperable pin and slot means having means engageable upon rotation of the control member in one direction through a predetermined angle relative to the mandrel to prevent downward movement of the control member and the expander means relative to the seal means after said expander means has moved the seal means into expanded sealing position, said mandrel, said control member and said expander means, having a flow passage for affording communication with the well flow conductor above and below said sealing means; plug means for closing said passage when the expander means is in seal expanding position, the control member being operatively connected to the plug means for moving the plug means upwardly to open position upon upward movement being imparted to the control member by the application of a constant force thereto after the expander means has been moved to its seal expanding position whereby the pressure above and below the seal means may be equalized, said cooperable slot and pin means permitting upward movement and preventing downward movement of the control member relative to the mandrel after the seal means has been moved into expanded sealing position; and means biasing the control member for rotation in one direction relative to the mandrel, said biasing means biasing the control member downwardly relative to the mandrel upon upward movement of the control member relative to the mandrel, said cooperable slot and pin means and said biasing means moving said lock means out of engagement with the anchoring means after the control member has been moved further upwardly a predetermined distance after the expander means has been moved to its upper seal expanding position and said plug means has been moved to open position upon further rotation in said one direction of the control member relative to the mandrel through a predetermined angle.

3. An anchoring and sealing device for use in a well flow conductor having an internal recess including: a tubular mandrel; anchoring means mounted on the mandrel and movable outwardly to expanded position in the internal recess of the well flow conductor, said anchoring means being mounted on the mandrel for limited longitudinal movement thereon; lock means mounted on the mandrel for limited longitudinal movement thereon and movable with the mandrel into engagement with the anchoring means when the anchoring means is in its expanded position to lock the anchoring means in the internal recess of the well flow conductor; a control member within the mandrel extending longitudinally of the mandrel and having an upper end portion engageable by running and pulling tools whereby longitudinal movement may be imparted to the control member relative to the anchoring means when the anchoring means is received in the annular recess of the well flow conductor; seal means carried by the mandrel for sealing between the mandrel and the well flow conductor; expander means carried by the control member and movable into engagement with the seal means to expand the seal means into sealing engagement with the well flow conductor after the anchoring means has been locked in expanded position; means operatively connecting said mandrel and said control member for limited movement longitudinally relative to each other and having means thereon coacting to position said mandrel and said control member in a plurality of predetermined longitudinally spaced positions with respect to each other, the control member being movable by the application of a continuous constant upward force thereto to move the mandrel and the control member upwardly relative to the anchoring means to cause the lock means to move into engagement with the anchoring means to lock the anchoring means in its expanded position and subsequently to move the control member upwardly to move the expander means into engagement with the seal means; and cooperable latch means on the mandrel and the anchoring means for preventing movement of the anchoring means relative to the mandrel after the mandrel has been moved relative to the anchoring means to lock the anchoring means in the internal recess of the well flow conductor.

4. An anchoring and sealing device for use in a well flow conductor having an internal recess including: a tubular mandrel having an expansible seal means on the lower end thereof; a control member longitudinally movable in the mandrel; means operatively connecting said mandrel and said control member for limited movement relative to each other longitudinally and rotatively about their longitudinal axes, said connecting means having means coacting to position said mandrel and said control member in a plurality of predetermined longitudinally spaced and rotatively offset positions with respect to each other; means biasing said control member and said mandrel for rotatable movement relative to each other about their longitudinal axes in one direction; expander means carried by the control member; anchoring means mounted on the mandrel for limited longitudinal movement thereon and biased outwardly of the mandrel whereby the anchoring means moves into the internal recess of the well flow conductor when moved into alignment therewith; lock means carried by and operatively connected with the mandrel initially spaced from the anchoring means and movable with said mandrel into engagement with the anchoring means when the anchoring means is in engagement in the internal recess to lock the anchoring means against retraction from the recess to hold the mandrel against movement in the well flow conductor, the lock means being movable into locking engagement with the anchoring means and the expander means being subsequently movable into expanding engagement with the seal means upon the application of a continuous substantially constant upward movement to the control member, the control member including an upper section and a lower section, said upper section being releasably connected to said lower section, said lower section and the mandrel providing a flow passage affording fluid communication in the well flow conductor above and below the seal means; and plug means closing said flow passage and releasably connected to said lower section, said upper section engaging the plug means to move it upwardly relative to said lower section to open the flow passage, whereby the pressure above and below the seal means may be equalized upon upward movement of said upper section relative to said lower section when the expander means is in seal means expanding position.

5. An anchoring and sealing device for use in a well flow conductor having an internal recess including: a tubular mandrel having an expansible seal means on the lower end thereof; a control member longitudinally movable in the mandrel; means operatively connecting said mandrel and said control member for limited movement relative to each other longitudinally and rotatively about their longitudinal axes; means biasing said control member and said mandrel for rotation about their longitudinal axes relative to each other; said connecting means having means coacting to position said mandrel and said control member in a plurality of predetermined longitudinally spaced and rotatively offset positions with respect to each other; an expander means carried by the control member; anchoring means mounted on the mandrel for limited longitudinal movement thereon and biased outwardly of the mandrel whereby the anchoring means moves into the internal recess of the well flow conductor when moved into alignment therewith; lock means carried by and operatively connected with the mandrel initially spaced from the anchoring means and movable into engagement therewith when said mandrel is moved toward the anchoring means while the anchoring means is in engagement in the internal recess to lock the anchoring means against retraction from the recess to hold the mandrel against movement in the well flow conductor, the lock means being movable into locking engagement with the anchoring means and the expander means being subsequently movable into expanding engagement with the seal means upon the application of a continuous substantially constant upward movement to the control member, the control member including an upper section and a lower section, said upper section being releasably connected to said lower section, said lower section and the mandrel providing a flow passage affording fluid communication in the well flow conductor above and below the seal means; plug means closing said flow passage and releasably connected to said lower section, said upper section engaging said plug means to move it upwardly relative to said lower section to open the flow passage whereby the pressure above and below the seal means may be equalized upon upward movement of the upper section of the control member relative to the lower section thereof when the expander means is in seal means expanding position; and cooperable stop means on the mandrel and the lower section for limiting upward movement of the lower section in the mandrel.

6. An anchoring and sealing device for use in a well flow conductor having an internal recess including: a tubular mandrel having an expansible seal means on the lower end thereof; a control member longitudinally movable in the mandrel; means operatively connecting said mandrel and said control member for limited movement relative to each other longitudinally and rotatively about their longitudinal axes; means biasing said control member and said mandrel for rotation about their longitudinal axes relative to each other; said connecting means having means coacting to position said mandrel and said control member in a plurality of predetermined longitudinally spaced and rotatively offset positions with respect to each other; expander means carried by the control member; anchoring means mounted on the mandrel for limiting longitudinal movement thereon and biased outwardly of the mandrel whereby the anchoring means moves into the internal recess of the well flow conductor when moved into alignment therewith; lock means carried by and operatively connected with the mandrel initially spaced from the anchoring means and movable into engagement therewith when the mandrel is moved upwardly relative to said anchoring means while said anchoring means is in engagement in the internal recess to lock the anchoring means against retraction from the recess to hold the mandrel against movement in the well flow conductor, the lock means being movable into locking engagement with the anchoring means and the expander means being subsequently movable into expanding engagement with the seal means upon the application of a continuous substantially constant upward movement to the control member, the control member including an upper section and a lower section, said upper section being releasably connected to said lower section, said lower section and the mandrel providing a flow passage affording fluid communication in the well flow conductor above and below the seal means; plug means closing said flow passage and releasably connected to said lower section, said upper section engaging the plug means to move it upwardly relative to said lower section to open the flow passage, whereby the pressure above and below the seal means may be equalized upon upward movement of said upper section relative to said lower section when the expander means is in seal means expanding position; and cooperable stop means on the mandrel and said lower section for limiting upward movement of said lower section in the mandrel, said upper section being releasable from the lower section when upward movement of the lower section and the mandrel is arrested by the engagement of said cooperable stop means.

7. An anchoring and sealing device for use in a well flow conductor having an internal recess including: a tubular mandrel having an expansible seal means on the lower end thereof; a control member longitudinally movable in the mandrel; means operatively connecting said mandrel and said control member for limited movement relative to each other longitudinally and rotatively about their longitudinal axes; means biasing said control member and said mandrel for rotation about their longitudinal axes relative to each other; said connecting means having means coacting to position said mandrel and said control member in a plurality of predetermined longitudinally spaced and rotatively offset positions with respect to each other; expander means carried by the control member; anchoring means mounted on the mandrel for limited longitudinal movement thereon and biased outwardly of the mandrel whereby the anchoring means moves into the internal recess of the well flow conductor when moved into alignment therewith; lock means carried by and operatively connected with the mandrel initially spaced from the anchoring means and movable into engagement therewith when the anchoring means is in engagement in the internal recess to lock the anchoring means against retraction from the recess to hold the mandrel against movement in the well flow conductor, the lock means being movable into locking engagement with the anchoring means and the expander means being subsequently movable into expanding engagement with the seal means upon the application of a continuous substantially constant upward movement to the control member, the control member including an upper section and a lower section, said upper section being releasably connected to said lower section, said lower section and the mandrel providing a flow passage affording fluid communication in the well flow conductor above and below the seal means; plug means closing said flow passage and releasably connected to said lower section, said upper section engaging said plug means to move it upwardly relative to said lower section to open the flow passage, whereby the pressure above and below the seal means may be equalized upon upward movement of said upper section relative to said lower section when the expander means is in seal means expanding position; and cooperative latch means on said upper section and said anchoring means for latching the anchoring means against longitudinal movement relative to the mandrel when the mandrel has been moved longitudinally upwardly relative to the anchoring means to cause the lock means to move into locking engagement with the anchoring means.

8. An anchoring and sealing device for use in a well flow conductor having an internal recess including: a tubular mandrel having an expansible seal means on the lower end thereof; a control member longitudinally movable in the mandrel; means operatively connecting said mandrel and said control member for limited movement relative to each other longitudinally and rotatively about their longitudinal axes; means biasing said control member and said mandrel for relative rotation about their longitudinal axes with respect to each other; said connecting means having means coacting to position said mandrel and said control member in a plurality of predetermined longitudinally spaced and rotatively offset positions with respect to each other; expander means carried by the control member; anchoring means mounted on the mandrel for limited longitudinal movement thereon and biased outwardly of the mandrel whereby the anchoring means moves into the internal recess of the well flow conductor when moved into alignment therewith; lock means carried by and operatively longitudinally movably connected with the mandrel initially spaced from said anchoring means and movable into engagement with the anchoring means to move said anchoring means into anchoring engagement in the internal recess to lock the anchoring means against retraction from the recess to hold the mandrel against movement in the well flow conductor, the lock means being movable into locking engagement with the anchoring means and the expander means being subsequently movable into expanding engagement with the seal means upon the application of a continuous substantially constant upward movement to the control member, the control member including an upper section and a lower section, said upper section being releasably connected to said lower section, said lower section and the mandrel providing a flow passage affording fluid communication in the well flow conductor above and below the seal means; plug means closing said flow passage and releasably connected to said lower section, said upper section engaging the plug means to move it upwardly relative to said lower section to open said flow passage, whereby the pressure above and below the seal means may be equalized upon upward movement of the upper section relative to the lower section when the expander means is in seal means expanding position; and cooperative latch means on said upper section and said anchoring means for latching the anchoring means against longitudinal movement relative to the mandrel when the mandrel has been moved longitudinally upwardly relative to the anchoring means to cause the lock means to move into locking engagement with the anchoring means, said latch means being engageable with said upper section for preventing upward movement of said upper section of the control member relative to the mandrel until said anchoring means has been locked in expanded position whereupon upward movement of the control member relative to the mandrel moves the seal expander into expanding engagement with the seal of the mandrel.

9. An anchoring and sealing device for use in a well flow conductor having an internal recess including: a tubular mandrel having an expansible seal means on the lower end thereof; a control member longitudinally movable in the mandrel; means operatively connecting said mandrel and said control member for limited movement relative to each other longitudinally and rotatively about their longitudinal axes; means biasing said control member and said mandrel for relative rotation about their longitudinal axes with respect to each other; said connecting means having means coacting to position said mandrel and said control member in a plurality of predetermined longitudinally spaced and rotatively offset positions with respect to each other; expander means carried by the control member; anchoring means mounted on the mandrel for limited longitudinal movement thereon and biased outwardly of the mandrel whereby the anchoring means moves into the internal recess of the well flow conductor when moved into alignment therewith; lock means carried by and operatively longitudinally movably connected with the mandrel initially spaced from said anchoring means and movable into engagement therewith when said anchoring means is in engagement in the internal recess to lock the anchoring means against retraction from the recess to hold the mandrel against movement in the well flow conductor, the lock means being movable into locking engagement with the anchoring means and the expander means being subsequently movable into expanding engagement with the seal means upon the application of a continuous substantially constant upward movement to the control member, the control member including an upper section and a lower section, said upper section being releasably connected to said lower section, said lower section and the mandrel providing a flow passage affording fluid communication in the well flow conductor above and below the seal means; and plug means closing said flow passage and releasably connected to said lower section, said upper section engaging said plug means to move it upwardly relative to said lower section to open said flow passage, whereby the pressure above and below the seal means may be equalized upon upward movement of said upper section relative to said lower section when the expander means is in seal means expanding position; said means operatively connecting said mandrel and control member comprising cooperable pin and slot means on the control member and the mandrel, said pin and slot means coacting to prevent downward movement of the control member after the expander means has moved into its seal expanding position and coacting to permit first upward and then downward movement of the control member after the expander means has moved into its seal expanding position.

10. In combination with the device of claim 4, a running tool having a prong telescopable downwardly into said upper section; and cooperable latch means on said upper section and the prong of the running tool releasably securing said prong to said upper section, said latch means releasing said prong from said upper section after said expander means has been moved into expanding engagement with the seal means.

11. An anchoring and sealing device for use in a well flow conductor having an internal annular recess therein, said device including: a mandrel having an expansible sealing means thereon; anchoring means mounted on the mandrel for limited longitudinal movement with respect to said mandrel, said anchoring means being movable into expanded position in the annular recess of the well flow conductor to lock the mandrel against longitudinal movement in said well flow conductor; lock means operatively connected to the mandrel and movable therewith upon upward movement of the mandrel relative to the anchoring means into engagement with said anchoring means for preventing movement of said anchoring means out of said recess; expander means carried by the mandrel for limited longitudinal movement relative thereto, said expander means being movable into engagement with the sealing means for moving the sealing means into sealing engagement with the well flow conductor upon longitudinal upward movement of said expander means relative to said sealing means; control means longitudinally movably mounted in said mandrel and operatively connected to said mandrel for moving said mandrel and said lock means upwardly relative to said anchoring means, means operatively connecting said control means with said expander means whereby longitudinal upward movement of said control means relative to said mandrel moves said expander means upwardly relative to said sealing means into expanding engagement therewith; and means operatively connecting said mandrel and said control means for limited movement relative to each other longitudinally and rotatively about their longitudinal axes, said connecting means having means coacting to position said mandrel and said control means in a plurality of predetermined longitudinally spaced and rotatively offset positions with respect to each other, whereby the application of a continuous longitudinal upward force to said control means moves said mandrel, said lock means operatively connected with said mandrel and said expander means into locking and sealing positions.

12. An anchoring and sealing device for use in a well flow conductor having an internal annular recess therein including: a mandrel assembly; anchoring means mounted on the mandrel and movable outwardly to expanded position in the internal recess of the well flow conductor, said anchoring means being mounted on the mandrel for limited longitudinal movement thereon; lock means mounted on the mandrel for limited longitudinal movement thereon and operatively connected with said mandrel for movement with the mandrel into engagement with the anchoring means when the anchoring means is in expanded position to lock said anchoring means in expanded position; an elongate control member within the mandrel and movable longitudinally thereof and rotatively about its longitudinal axis with respect thereto, said control member having an upper end portion engageable by running and pulling tools whereby longitudinal movement may be imparted to the control member relative to the anchoring means when the anchoring means is received in the annular recess of the well flow conductor; seal means carried by the mandrel for sealing between the mandrel and the well flow conductor; expander means connected with the control member and movable therewith into engagement with the seal means to expand the seal means into sealing engagement with the well flow conductor after the anchoring means has been locked in expanded position; means operatively connecting said mandrel and said control member for limited longitudinal and rotative movement about their longitudinal axes relative to each other, said connecting means having means coacting to position said mandrel and said control member in a plurality of predetermined longitudinally spaced and rotatively displaced positions with respect to each other, said control member being movable by the application of a continuous constant longitudinal upward force to move the mandrel upwardly to move the lock means into engagement with the anchoring means to lock the anchoring means in expanded position, said control member then being further movable longitudinally upwardly relative to said mandrel to move the expander means into engagement with the seal means to expand said seal means to sealing position; and cooperable latch means on the mandrel and the anchoring means engageable to permit movement of the anchoring means relative to the mandrel after the mandrel has been moved to move the lock means to locking position with respect to said anchoring means.

13. An anchoring and sealing device for use in a well flow conductor having an internal recess including: a tubular mandrel; anchoring means mounted on the mandrel and movable outwardly to expanded position in the internal recess of the well flow conductor, the anchoring means being mounted on the mandrel for limited longitudinal movement thereon; lock means mounted on the mandrel for limited longitudinal movement thereon and movable with the mandrel upon upward movement of the mandrel relative to the anchoring means into locking engagement with the anchoring means when the anchoring means is in its expanded position to lock the anchoring means in the internal recess of the well flow conductor; a control member mounted in the mandrel for limited longitudinal movement relative to the mandrel extending longitudinally of the mandrel and having an upper end portion engageable by running and pulling tools whereby longitudinal movement may be imparted to the control member relative to the anchoring means when the anchoring means is received in the annular recess of the well flow conductor; means operatively connecting the mandrel and the control member for limited longitudinal movement relative to each other, said connecting means having means coacting to position said mandrel and said control member in a plurality of predetermined longitudinally spaced positions with respect to each other; seal means carried by the mandrel for sealing between the mandrel and the well flow conductor; and expander means carried by the control member and movable into engagement with the seal means when said control member is moved to one of said positions relative to the mandrel to expand the seal means into sealing engagement with the well flow conductor after the anchoring means has been locked into expanded position, said control member being movable by the application of a continuous constant upward force thereto to move the mandrel and the control member upwardly relative to the anchoring means to cause the lock means to move into engagement with the anchoring means to lock the anchoring means in its expanded position and subsequently to move the control member upwardly to said one of said positions to move the expander means into engagement with the seal means.

14. An anchoring and sealing device for use in a well flow conductor having an internal recess including: a tubular mandrel; anchoring means mounted on the mandrel and movable outwardly to expanded position in the internal recess of the well flow conductor, said anchoring means being mounted on the mandrel for limited longitudinal movement thereon; lock means mounted on the mandrel for limited longitudinal movement thereon and movable with the mandrel upon upward movement of the mandrel relative to the anchoring means into locking engagement with the anchoring means when the anchoring means is in its expanded position to lock the anchoring means in the internal recess of the well flow conductor; a control member mounted in the mandrel for limited longitudinal movement relative to the mandrel extending longitudinally of the mandrel and having an upper end portion engageable by running and pulling tools whereby longitudinal movement may be imparted to the control member relative to the anchoring means when the anchoring means is received in the annular recess of the well flow conductor; means connecting the mandrel and the control member for limited longitudinal movement relative to each other and for positioning the mandrel and the control means in different longitudinally spaced positions relative to each other; seal means carried by the mandrel for sealing between the mandrel and the well flow conductor; and expander means carried by the control member and movable into engagement with the seal means when said control member is moved to one of said positions relative to the mandrel to expand the seal means into sealing engagement with the well flow conductor after the anchoring means has been locked into expanded position, said control member being movable by the application of a continuous constant upward force thereto to move the mandrel and the control member upwardly relative to the anchoring means to cause the lock means to move into engagement with the anchoring means to lock the anchoring means in its expanded position and subsequently to move the control member upwardly to said one of said positions to move the expander means into engagement with the seal means, said means connecting the mandrel and the control member comprising cooperable pin and slot means, means biasing said control member for rotation about its longitudinal axis relative to said mandrel, said pin and slot means having means engageable upon such rotation of the control member in one direction through a predetermined angle relative to the mandrel to prevent downward movement of the control member and the expander means relative to the seal means after the expander means has moved the seal means into expanded sealing position.

15. An anchoring and sealing device for use in a well flow conductor having an internal recess including: a tubular mandrel; anchoring means mounted on the mandrel and movable outwardly to expanded position in the internal recess of the well flow conductor, said anchoring means being mounted on the mandrel for limited longitudinal movement thereon; lock means mounted on the mandrel for limited longitudinal movement thereon and movable with the mandrel upon upward movement of the mandrel relative to the anchoring means into locking engagement with the anchoring means when the anchoring means is in its expanded position to lock the anchoring means in the internal recess of the well flow conductor; a control member mounted in the mandrel for limited longitudinal movement relative to the mandrel extending longitudinally of the mandrel and having an upper end portion engageable by running and pulling tools whereby longitudinal movement may be imparted to the control member relative to the anchoring means when the anchoring means is received in the annular recess of the well flow conductor; seal means carried by the mandrel for sealing between the mandrel and the well flow conductor; expander means carried by the control member and movable into engagement with the seal means to expand the seal means into sealing engagement with the well flow conductor after the anchoring means has been locked into expanded position, said control member being movable by the application of a continuous constant upward force thereto to move the mandrel and the control member upwardly relative to the anchoring means to cause the lock means to move into engagement with the anchoring means to lock the anchoring means in its expanded position and subsequently to move the control member upwardly to move the seal expander means into engagement with the seal means, said mandrel and said control member having cooperable pin and slot means operatively connecting the mandrel and the control member for limited movement relative to each other longitudinally and rotatively about their longitudinal axes for positioning the mandrel and the control member in a plurality of predetermined different longitudinally spaced and rotatively displaced positions with respect to each other, said cooperable pin and slot means being engageable upon rotation of the control member in one direction through a predetermined angle relative to the mandrel to prevent downward movement of the control member and the expander means relative to the seal means after said expander means has moved the seal means into expanded sealing position; and means biasing said control member for rotation in said one direction relative to said mandrel.

16. An anchoring and sealing device for use in a well flow conductor having an internal recess including: a tubular mandrel; anchoring means mounted on the mandrel and movable outwardly to expanded position in the internal recess of the well flow conductor, said anchoring means being mounted on the mandrel for limited longitudinal movement thereon; lock means mounted on the mandrel for limited longitudinal movement thereon and movable with the mandrel upon upward movement of the mandrel relative to the anchoring means into locking engagement with the anchoring means when the anchoring means is in its expanded position to lock the anchoring means in the internal recess of the well flow conductor; a control member mounted in the mandrel for limited movement relative to the mandrel extending longitudinally of the mandrel and having an upper end portion engageable by running and pulling tools whereby longitudinal movement may be imparted to the control member relative to the anchoring means when the anchoring means is received in the annular recess of the well flow conductor; seal means carried by the mandrel for sealing between the mandrel and the well flow conductor; expander means carried by the control member and movable into engagement with the seal means to expand the seal means into sealing engagement with the well flow conductor after the anchoring means has been locked into expanded position, said control member being movable by the application of a continuous constant upward force thereto to move the mandrel and the control member upwardly relative to the anchoring means to cause the lock means to move into engagement with the anchoring means to lock the anchoring means in its expanded position and subsequently to move the control member upwardly to move the seal expander means into engagement with the seal means, said mandrel and said control member having cooperable pin and slot means operatively connecting the mandrel and the control member for limited movement relative to each other longitudinally and rotatively about their longitudinal axes for positioning the mandrel and the control member in a plurality of predetermined different longitudinally spaced and rotatively displaced positions with respect to each other, said cooperable pin and slot means being engageable upon rotation of the control member in one direction through a predetermined angle relative to the mandrel to prevent downward movement of the control member and the expander means relative to the seal means after said expander means has moved the seal means into expanded sealing position; and means biasing said control member for rotation in said one direction relative to said mandrel, said cooperable pin and slot means engaging to prevent rotational movement of said control member in said one direction relative to said mandrel prior to the movement of the seal expanding means into expanding engagement with the seal means.

17. An anchoring and sealing device for use in a well flow conductor having an internal recess including: a tubular mandrel; anchoring means mounted on the mandrel and movable outwardly to expanded position in the internal recess of the well flow conductor, said anchoring means being mounted on the mandrel for limited longitudinal movement thereon; lock means mounted on the mandrel for limited longitudinal movement thereon and movable with the mandrel upon upward movement of the mandrel relative to the anchoring means into locking engagement with the anchoring means when the anchoring means is in its expanded position to lock the anchoring means in the internal recess of the well flow conductor; a control member mounted in the mandrel for limited longitudinal movement relative to the mandrel extending longitudinally of the mandrel and having an upper end portion engageable by running and pulling tools whereby longitudinal movement may be imparted to the control member relative to the anchoring means when the anchoring means is received in the annular recess of the well flow conductor; seal means carried by the mandrel for sealing between the mandrel and the well flow conductor; expander means carried by the control member and movable into engagement with the seal means to expand the seal means into sealing engagement with the well flow conductor after the anchoring means has been locked into expanded position, said control member being movable by the application of a continuous constant upward force thereto to move the mandrel and the control member upwardly relative to the anchoring means to cause the lock means to move into engagement with the anchoring means to lock the anchoring means in its expanded position and subsequently to move the control member upwardly to move the expander means into engagement with the seal means, said mandrel and said control member having cooperable pin and slot means operatively connecting the mandrel and the control member for limited movement relative to each other longitudinally and rotatively about their longitudinal axes for positioning the mandrel and the control member in a plurality of predetermined different longitudinally spaced and rotatively displaced positions with respect to each other, said cooperable pin and slot means being engageable upon rotation of the control member in one direction through a predetermined angle relative to the mandrel to prevent downward movement of the control member and the seal expander means relative to the seal means after the expander means has moved the seal means into expanded sealing position, said expander means, said control member and said mandrel having a flow passage affording communication with the well flow conductor above and below the seal means; and a plug means for closing said passage when the expander means is in seal expanding position, the control member being operatively connected to the plug means for moving the plug means upwardly to open position upon upward movement being imparted to the control member after the expander means has been moved to its seal expanding position whereby the pressure above and below the seal means may be equalized, said cooperable slot and pin means permitting upward movement and preventing downward movement of the control member relative to the mandrel after the seal means has been moved into expanded sealing position.

18. An anchoring and sealing device for use in a well flow conductor having an internal recess including: a tubular mandrel; anchoring means mounted on the mandrel and movable outwardly to expanded position in the internal recess of the well flow conductor, said anchoring means being mounted on the mandrel for limited longitudinal movement thereon; lock means mounted on the mandrel for limited longitudinal movement thereon operatively connected with said mandrel to be movable upwardly with the mandrel into engagement with the anchoring means when the anchoring means is in its expanded position to lock the anchoring means in the internal recess of the well flow conductor; a control member within and extending longitudinally of the mandrel and having an upper end portion engageable by running and pulling tools whereby longitudinal movement may be imparted to the control member relative to the anchoring means when the anchoring means is received in the annular recess of the well flow conductor; seal means carried by the mandrel for sealing between the mandrel and the well flow conductor; expander means carried by the control member and movable into engagement with the seal means to expand the seal means into sealing engagement with the well flow conductor after the anchoring means has been locked in expanded position; means operatively connecting said mandrel and said control member for limited movement relative to each other longitudinally and rotatively about their longitudinal axes, said connecting means having means coacting to position said mandrel and said control member in a plurality of predetermined longitudinally spaced and rotatively offset positions with respect to each other, said control member being movable by the application of a continuous constant upward force thereto to move the mandrel and the control member upwardly relative to the anchoring means to cause the lock means to move into engagement with the anchoring means to lock the anchoring means in its expanded position and subsequently to move the control member upwardly to move the seal expander means into engagement with the seal means; cooperable latch means on the mandrel and the anchoring means for releasably preventing movement of the anchoring means relative to the mandrel when the mandrel has been moved relative to the anchoring means to lock the anchoring means in the internal recess of the well flow conductor; and means biasing the control member for rotation in one direction relative to the mandrel, said biasing means biasing the control member downwardly relative to the mandrel, said means connecting the mandrel and the control member comprising cooperable pin and slot means, said cooperable pin and slot means and said biasing means moving said control member downwardly relative to the mandrel to cause said expander means to move out of expanding engagement with the seal means and said lock means to move downwardly relative to said mandrel out of engagement with the anchoring means.

19. An anchoring and sealing device for use in a well flow conductor having an internal recess including: a tubular mandrel having an expansible sealing means on the lower end thereof; anchoring means mounted on the mandrel for limited longitudinal movement thereon and biased outwardly of the mandrel whereby the anchoring means moves into the internal recess of the well flow conductor when moved into alignment therewith; a control member carried by the mandrel; means operatively connecting said mandrel and said control member for limited longitudinal movement relative to each other, said connecting means having means thereon coengageable to position said mandrel and said control member in a plurality of predetermined longitudinally spaced positions with respect to each other; lock means carried by the mandrel initially spaced from said anchoring means; means operatively connecting said lock means with said mandrel for limited longitudinal movement thereon and providing means for moving said lock means with said mandrel whereby said lock means is movable into engagement with the anchoring means when said anchoring means is in engagement in the internal recess to lock the anchoring means against retraction from the recess to hold the mandrel against movement relative to the bore wall of the well flow conductor upon upward movement of the control member relative to the mandrel; expander means carried by the control member and movable into engagement with the sealing means to expand the sealing means into sealing engagement with the well flow conductor after the anchoring means has been locked in expanded position, said control member having an upper end portion engageable by running and pulling tools, the lock means being movable into locking engagement with the anchoring means and the expander means being subsequently movable into expanding engagement with the seal means upon the application of continuous substantially constant upward movement to the upper end of the control member.

20. An anchoring and sealing device for use in a well flow conductor having an internal recess including: a tubular mandrel having an expansible seal means on the lower end thereof; a control member longitudinally movable in the mandrel; means operatively connecting said mandrel and said control member for limited movement relative to each other longitudinally and rotatively about their longitudinal axes; means biasing said control member and said mandrel for relative rotation about their longitudinal axes with respect to each other; said connecting means having means coacting to position said mandrel and said control member in a plurality of predetermined longitudinally spaced and rotatively offset positions with respect to each other; expander means carried by the control member; anchoring means mounted on the mandrel for limited longitudinal movement thereon and biased outwardly of the mandrel whereby the anchoring means moves into the internal recess of the well flow conductor when moved into alignment therewith; lock means carried by and operatively longitudinally movably connected with the mandrel initially spaced from said anchoring means and movable into engagement therewith when said anchoring means is in engagement in the internal recess to lock the anchoring means against retraction from the recess to hold the mandrel against movement in the well flow conductor, the lock means being movable into locking engagement with the anchoring means and the expander means being subsequently movable into expanding engagement with the seal means upon the application of a continuous substantially constant upward movement to the control member, the control member including an upper section and a lower section, said upper section being releasably connected to said lower section, said lower section and the mandrel providing a flow passage affording fluid communication in the well flow conductor above and below the seal means; and plug means closing said flow passage and releasably connected to said lower section, said upper section engaging said plug means to move it upwardly relative to said lower section to open the flow passage, whereby the pressure above and below the seal means may be equalized upon upward movement of said upper section relative to said lower section when the expander means is in seal means expanding position; said means operatively connecting said mandrel and said control member comprising cooperable pin and slot means on the control member and the mandrel, said cooperable pin and slot means coacting to prevent downward movement of the control member after the expander means has moved into its seal expanding position and coacting to permit first further upward and then downward movement of the control member, said further upward movement of the control member causing said upper section to move upwardly relative to said lower section to move the plug means upwardly to equalize the pressure in the well flow conductor above and below the seal means.

21. An anchoring and sealing device for use in a well flow conductor having an internal recess including: a tubular mandrel having an expansible seal means on the lower end thereof; a control member longitudinally movable in the mandrel; means connecting the mandrel and the control member for limited longitudinal movement relative to each other and for positioning the mandrel and the control member in different longitudinally spaced positions relative to each other; expander means carried by the control member; anchoring means mounted on the mandrel for limited longitudinal movement thereon and biased outwardly of the mandrel whereby the anchoring means moves into the internal recess of the well flow conductor when moved into alignment therewith; lock means carried by and operatively longitudinally movably connected with the mandrel initially spaced from the anchoring means and movable into engagement therewith when the anchoring means is in engagement in the internal recess to lock the anchoring means against retraction from the recess to hold the mandrel against movement in the well flow conductor, the lock means being movable into locking engagement with the anchoring means and the expander means being subsequently movable into expanding engagement with the seal means upon the application of a continuous substantially constant upward movement to the control member, the control member including an upper section and a lower section, said upper section being releasably connected to said lower section, said lower section and the mandrel providing a flow passage affording fluid communication in the well flow conductor above and below the seal means; plug means closing said flow passage and releasably connected to said lower section, said upper section engaging said plug means to move it upwardly relative to said lower section to open said flow passage, whereby the pressure above and below the seal means may be equalized upon upward movement of said upper section relative to said lower section when the expander means is in seal means expanding position; said means connecting the mandrel and the control member comprising cooperable pin and slot means on the control member and the mandrel movably connecting said mandrel and said control member for limited movement relative to each other longitudinally and rotatively about their longitudinal axes, said pin and slot means coacting to position said mandrel and said control member in a plurality of predetermined longitudinally spaced and rotatively offset positions with respect to each other, said pin and slot means being engageable to prevent downward movement of the control member after the expander means has moved into its seal expanding position and coacting to permit first further upward movement and then downward movement of the control member; cooperable stop means on the mandrel and said lower section for limiting upward movement of said lower section relative to the mandrel; and resilient means engaging the mandrel and said upper section for biasing said upper section of the control member for rotation about a longitudinal axis relative to the mandrel and yieldingly resisting upward movement of said upper section relative to the mandrel, said upper section rotating under the influence of the biasing means when said upper section has been moved upwardly to a predetermined position and upward movement of said lower section has been arrested by the cooperable stop means to move the cooperable pin and slot means into position to arrest downward movement of the upper section of the control member, said cooperable pin and slot means coacting to permit downward movement of the upper section of the control member upon upward and rotational movement of said upper section after downward movement of said upper section has been arrested by said cooperable pin and slot means.

References Cited in the file of this patent

UNITED STATES PATENTS

| | | |
|---|---|---|
| 2,605,131 | Marshall | July 29, 1952 |
| 2,605,843 | Baker | Aug. 5, 1952 |
| 2,673,614 | Miller | Mar. 30, 1954 |
| 2,737,245 | Knox | Mar. 6, 1956 |
| 2,784,789 | Otis | Mar. 12, 1957 |
| 2,814,348 | Schramm | Nov. 29, 1957 |